US008528414B2

(12) United States Patent
Miyajima et al.

(10) Patent No.: US 8,528,414 B2
(45) Date of Patent: Sep. 10, 2013

(54) APPARATUS FOR MEASURING A MECHANICAL QUANTITY

(75) Inventors: Kentaro Miyajima, Uenohara (JP); Mitsugu Kusunoki, Kunitachi (JP)

(73) Assignee: Hitachi, Ltd., Tokyo (JP)

( * ) Notice: Subject to any disclaimer, the term of this patent is extended or adjusted under 35 U.S.C. 154(b) by 229 days.

(21) Appl. No.: 13/180,603

(22) Filed: Jul. 12, 2011

(65) Prior Publication Data

US 2012/0048028 A1    Mar. 1, 2012

(30) Foreign Application Priority Data

Aug. 27, 2010  (JP) ................. 2010-190255

(51) Int. Cl.
*G01B 7/16*    (2006.01)
*G01L 1/00*    (2006.01)

(52) U.S. Cl.
USPC .......................................................... 73/777

(58) Field of Classification Search
USPC .......................................................... 73/777
See application file for complete search history.

(56) References Cited

U.S. PATENT DOCUMENTS

| | | | | |
|---|---|---|---|---|
| 4,417,477 A * | 11/1983 | Poff | ............ | 73/766 |
| 6,417,678 B2 * | 7/2002 | Furukawa | ............ | 324/721 |
| 7,430,920 B2 * | 10/2008 | Sumigawa et al. | ............ | 73/777 |
| 7,430,921 B2 * | 10/2008 | Ohta et al. | ............ | 73/777 |
| 7,484,422 B2 * | 2/2009 | Sumigawa et al. | ............ | 73/777 |
| 7,707,894 B2 * | 5/2010 | Sumigawa et al. | ............ | 73/777 |
| 7,770,462 B2 * | 8/2010 | Ohta et al. | ............ | 73/777 |
| 7,893,810 B2 | 2/2011 | Ohta et al. | | |
| 8,056,421 B2 * | 11/2011 | Sumigawa et al. | ............ | 73/777 |
| 2006/0043508 A1 * | 3/2006 | Ohta et al. | ............ | 257/417 |
| 2006/0207339 A1 * | 9/2006 | Sumigawa et al. | ............ | 73/777 |
| 2007/0151356 A1 * | 7/2007 | Sumigawa et al. | ............ | 73/777 |
| 2007/0205475 A1 * | 9/2007 | Ohta et al. | ............ | 257/417 |
| 2008/0208425 A1 * | 8/2008 | Riccoti et al. | ............ | 701/70 |
| 2008/0289432 A1 * | 11/2008 | Ohta et al. | ............ | 73/777 |
| 2009/0007686 A1 * | 1/2009 | Sumigawa et al. | ............ | 73/777 |
| 2010/0154555 A1 * | 6/2010 | Sumigawa et al. | ............ | 73/777 |
| 2012/0048028 A1 * | 3/2012 | Miyajima et al. | ............ | 73/777 |

FOREIGN PATENT DOCUMENTS

JP    62160772 A  *  7/1987
JP    2008-82907 A    4/2008

* cited by examiner

*Primary Examiner* — Lisa Caputo
*Assistant Examiner* — Jamel Williams
(74) *Attorney, Agent, or Firm* — Miles & Stockbridge P.C.

(57) ABSTRACT

Because of stress occurring due to a change in temperature, and presence of heat distribution on a semiconductor substrate, and a dopant dosage gradient, an offset output occurs to a Wheatstone bridge circuit intended for detection of strain, posing a problem. To solve the problem, diffusion resistors are disposed in the form of a matrix, and bridge resistors $R_{v1}$, $R_{v2}$ each are formed by selectively connecting diffusion resistors disposed in each odd column, in series with each other, while $R_{h1}$, $R_{h2}$ each are formed by selectively connecting diffusion resistors disposed in each even column, in series with each other.

20 Claims, 9 Drawing Sheets

APPARATUS FOR MEASURING A MECHANICAL QUANTITY

CLAIM OF PRIORITY

The present application claims priority from Japanese patent application JP 2010-190255 filed on Aug. 27, 2010, the content of which is hereby incorporated by reference into this application.

FIELD OF THE INVENTION

The present invention relates to an apparatus for measuring a mechanical quantity, and in particular, to a sensor for measuring a mechanical quantity by use of a strain detector formed on the surface of a semiconductor substrate.

BACKGROUND OF THE INVENTION

In Japanese Unexamined Patent Application Publication No. 2008-82907, there has been disclosed a semiconductor chip wherein impurity layers are locally provided on a semiconductor monocrystal substrate, and measurement is made on strain of an object under test with the semiconductor monocrystal substrate stuck thereto, or embedded therein, on the basis of dependency of a resistance value of the impurity layers, on strain. Because strain sensitivity of impurity resistance has crystal anisotropy, a Wheatstone bridge circuit (hereinafter referred to as a bridge or a bridge circuit) is formed by use of four impurity layers configured such that current is caused to flow in specific directions, thereby realizing measurement of strain in the specific orientations.

SUMMARY OF THE INVENTION

Figure 1:
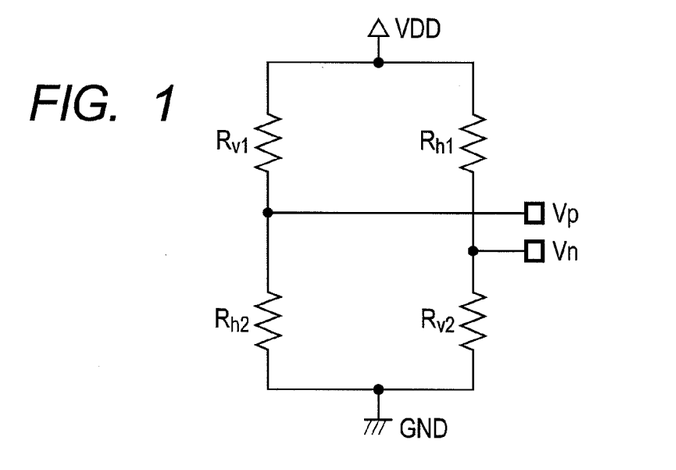
FIG. 1 is a circuit diagram showing a circuit configuration of a bridge for use in an apparatus for measuring a mechanical quantity.

FIG. 1 is a circuit diagram showing a circuit configuration of a bridge for use in a sensor. The bridge is comprised of four p-type diffusion resistors $R_{v1}$, $R_{v2}$, $R_{h1}$, and $R_{h2}$. A power supply voltage VDD is applied to the bridge wherein the resistors $R_{v1}$, $R_{h2}$, connected in series with each other, are connected in parallel with the resistors $R_{h1}$, $R_{v2}$, connected in series with each other. A connection node between the resistors $R_{v1}$, $R_{h2}$ is indicated as an output Vp while a connection node between the resistors $R_{h1}$, $R_{v2}$ is indicated as an output Vn, and an apparatus for measuring a mechanical quantity detects a change in resistance value, occurring to the respective resistors $R_{v1}$, $R_{v2}$, $R_{h1}$, $R_{h2}$, upon the apparatus being subjected to stress, as a potential difference between the output Vp, and the output Vn.

A current is caused to flow through the bridge by the agency of the power supply voltage VDD that is applied to the bridge in order to measure strain. Accordingly, in order to inhibit an increase in power consumption of a semiconductor chip with such a strain sensor mounted therein, assuming that the power supply voltage VDD is 3 V, and the current flowing through the bridge is not more than 20 μA, respective resistance values of the resistors $R_{v1}$, $R_{v2}$, $R_{h1}$, and Rh2 need be at least 75 KΩ. Assuming that a sheet resistance value of the p-type diffusion resistor is more or less 150 Ω/□, if resistor is formed by use of a diffusion resistor 2 μm in width, a diffusion resistor area required of the respective resistors $R_{v1}$, $R_{v2}$, $R_{h1}$, $R_{h2}$ will be 2000 μm².

Figure 2A:
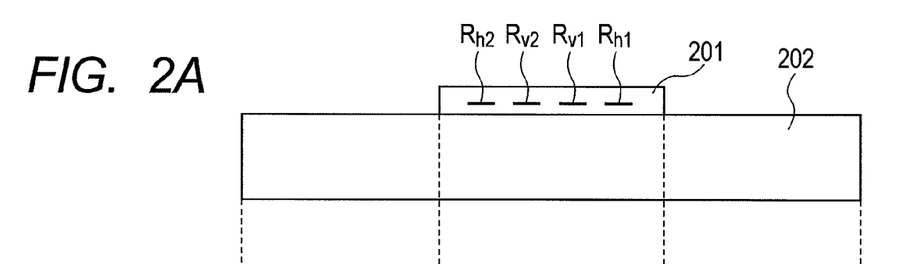
FIG. 2A shows a reference state.
Figure 2B:
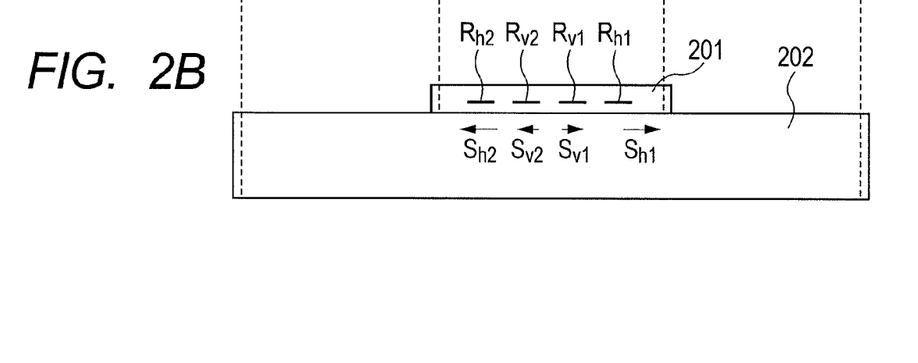
FIG. 2B shows a state in which the apparatus at an ambient temperature different from that in the reference state.

In FIGS. 2A and 2B, there is shown a state in which an apparatus 201 for measuring a mechanical quantity, incorporating the bridge shown in FIG. 1, is stuck to an object 202 under test. FIG. 2A shows a reference state in which the respective resistance values of the resistors $R_{v1}$, $R_{v2}$, $R_{h1}$, and $R_{h2}$ are equal to each other. Accordingly, the potential difference between the output Vp, and the output Vn is 0 V. However, the apparatus for measuring a mechanical quantity is actually used in a variety of environments. FIG. 2B shows a state in which a change in temperature from the reference state shown in FIG. 2A has occurred, so that the apparatus 201 for measuring a mechanical quantity, and the object 202 under test each have undergone a deformation due to thermal expansion. Because the apparatus 201 for measuring a mechanical quantity differs in material quality, and shape from the object 202 under test, there exists a difference in thermal expansion coefficient therebetween. For this reason, if a thermal expansion occurs, stress occurs to each of the diffusion resistors $R_{v1}$, $R_{v2}$, $R_{h1}$, $R_{h2}$, whereupon strains $S_{v1}$, $S_{v2}$, $S_{h1}$, and $S_{h2}$ will occur to the resistors, respectively. Herein, assuming that a strain value is S, a diffusion resistance value is r, and gage factor of diffusion resistance is α, a change Δr in a resistance value can be expressed by the following formula:

$$\Delta r = \alpha \times S \times R$$

Now, since strain to which a diffusion resistor is subjected is dependent on a position where the diffusion resistor is disposed, the following formula will hold:

$$S_{v1} \neq S_{v2} \neq S_{h1} \neq S_{h2}$$

Accordingly, the resistance value changes $\Delta r_{v1}$, $\Delta r_{v2}$, $\Delta r_{h1}$, $\Delta r_{h2}$, occurring to the respective diffusion resistors, are as follows:

$$\Delta r_{v1} = \alpha \times S_{v1} \times r_{v1}, \Delta r_{v2} = \alpha \times S_{v2} \times r_{v2},$$

$$\Delta r_{h1} = \alpha \times S_{h1} \times r_{h1}, \text{ and } \Delta r_{h2} = \alpha \times S_{h2} \times r_{h2}$$

where $r_{v1}$, $r_{v2}$, $r_{h1}$, and $r_{h2}$ each are a resistance value of a diffusion resistor in a reference state. As a result, the following formula will hold:

$$\Delta r_{v1} \neq \Delta r_{v2} \neq \Delta r_{h1} \neq \Delta r_{h2}$$

If the diffusion resistance area is around 2000 μm² as previously estimated, the respective resistors are inevitably disposed at positions on a semiconductor chip, away from each other, and a difference in amount of a change in diffusion resistance, due to a change in temperature, will increase to a non-negligible magnitude. As a result, a significant potential difference will occur between the output Vp, and the output Vn, whereupon there occurs a so-called an output offset voltage.

Thus, the apparatus 201 for measuring a mechanical quantity is intended to essentially detect strain occurring to the object 202 under test, however, it follows that a potential difference is outputted simply due to variation in ambient temperature even if no strain occurs to the object 202 under test. Furthermore, it has turned out that the output offset voltage occurs not only in the case of stress occurring, due to such a change in temperature, but also even in the case where heat distribution on a semiconductor substrate, and a dopant dosage gradient exist.

It is therefore an object of the invention, to reduce an output offset voltage that occurs owing to the cause described as above to thereby enhance the performance of an apparatus for measuring a mechanical quantity.

A typical embodiment of the present invention is described hereunder. Diffusion resistors small in resistance value are disposed in the form of a matrix, and bridge resistors each are made up by connecting diffusion resistors selected from the matrix, in series with each other.

The invention has an advantageous effect in that if a change in temperature occurs with an apparatus for measuring a mechanical quantity, stuck to, or embedded in an object under test, it is possible to render respective strains to which respective resistor of the Wheatstone bridge circuit are subjected constant, thereby preventing occurrence of an output offset due to the change in temperature. Further, it is also possible to prevent occurrence of an output offset due to heat distribution on a semiconductor substrate, and dopant dosage gradient of impurity diffusion.

BRIEF DESCRIPTION OF THE DRAWINGS

FIGS. 2A and 2B show states in which the apparatus for measuring a mechanical quantity is stuck to an object under test, in which

FIGS. 7A and 7B are views of a p-type diffusion resistor (including a connector), in which

DETAILED DESCRIPTION OF THE PREFERRED EMBODIMENTS

Embodiments of the invention are described in detail hereinafter with reference to the accompanying drawings.

First Embodiment

Figure 3:
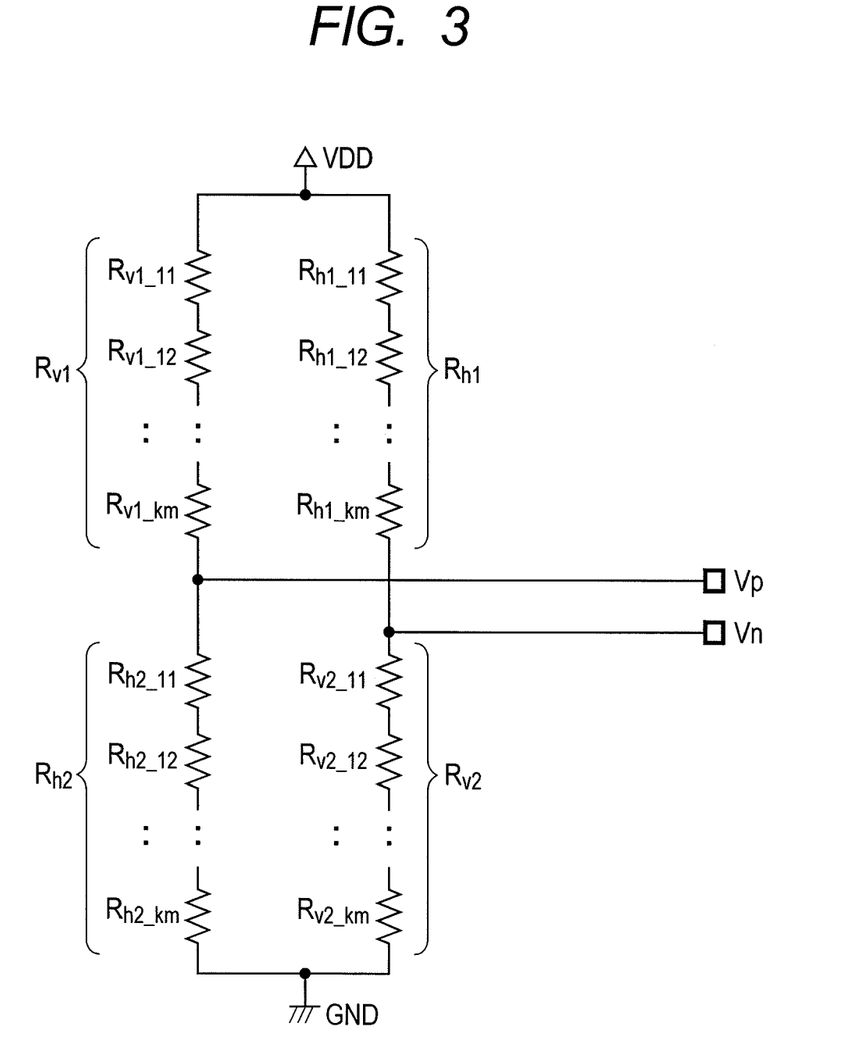
FIG. 3 is a circuit diagram showing a circuit configuration of a bridge according to one embodiment of the invention.

FIG. 3 is a circuit diagram showing a circuit configuration of a bridge according to one embodiment of the invention. As is the case with the circuit configuration of FIG. 1, a power supply voltage VDD is applied to a bridge wherein the resistors $R_{v1}$, $R_{h2}$, connected in series with each other, are connected in parallel with the resistors $R_{h1}$, $R_{v2}$, connected in series with each other. A connecting node between the resistors $R_{v1}$, $R_{h2}$ is indicated as an output Vp while a connecting node between the resistors $R_{h1}$, $R_{v2}$ is indicated as an output Vn. In this connection, the respective resistors $R_{v1}$, $R_{v2}$, $R_{h1}$, $R_{h2}$ (hereinafter referred to as bridge resistors) are comprised of k×m (k and m each being an integer) pieces of diffusion resistors (hereinafter referred to also as element resistors) connected in series with each other. In this case, assuming that respective resistance values (design values) of the bridge resistors in a reference state are $r_{v1}$, $r_{v2}$, $r_{h1}$, and $r_{h2}$ (generally, $r_{v1}=r_{v2}=r_{h1}=r_{h2}$), respective values of k×m pieces of the element resistors, making up each of the bridge resistors $R_{v1}$, $R_{v2}$, $R_{h1}$, $R_{h2}$, will be $r_{v1}/(k \times m)$, $r_{v2}/(k \times m)$, $r_{h1}/(k \times m)$, and $r_{h2}/(k \times m)$.

The bridge resistor $R_{v1}$ is made up by series connection of (k×m) pieces of the element resistors $R_{v1\_ab}$, the bridge resistor $R_{v2}$ by series connection of (k×m) pieces of the element resistors $R_{v2\_ab}$, the bridge resistor $R_{h1}$ by series connection of (k×m) pieces of the element resistors $R_{h1\_ab}$, and the bridge resistor $R_{h2}$ by series connection of (k×m) pieces of the element resistors $R_{h2\_ab}$ (a and b each being an integer, and $1 \leq a \leq k$, $1 \leq b \leq m$: the same applies hereinafter). This series-connection is implemented by use of a contact through hole for connection between the diffusion resistors, and an interconnect layer, as will be described later. This is generally implemented by use of a metal layer, and can be generally implemented at a low resistance, however, it is desirable to increase respective values k, m, as much as possible such that a resistance value of resistance (hereinafter referred to as connection resistance) of the contact through hole for connection between the element resistors, and the interconnect layer will fall in a range of, for example, not more than 1% of the resistance value of the element resistors so as to enable the resistance value of the connection resistance to be negligible.

Figure 4:
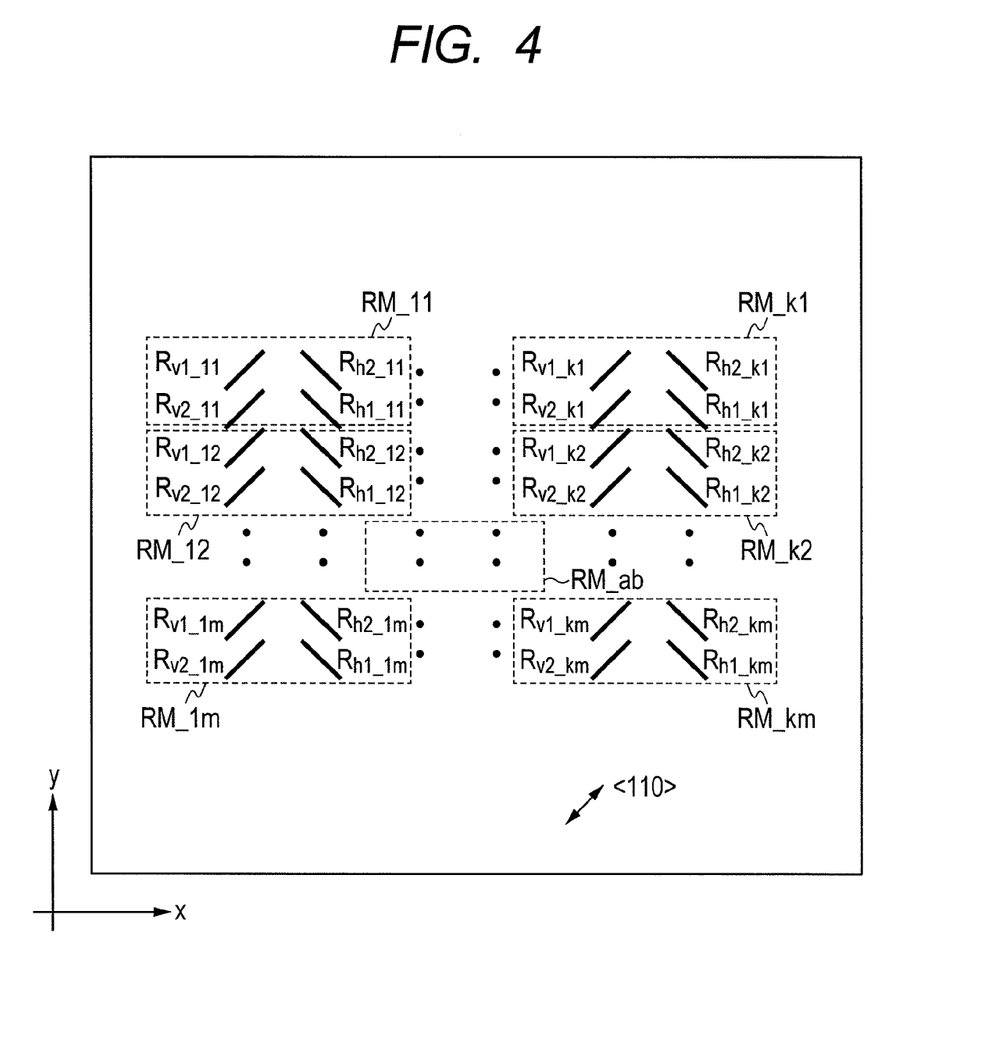
FIG. 4 is a schematic diagram showing a first disposition example of element resistors (diffusion resistors)
Figure 5:
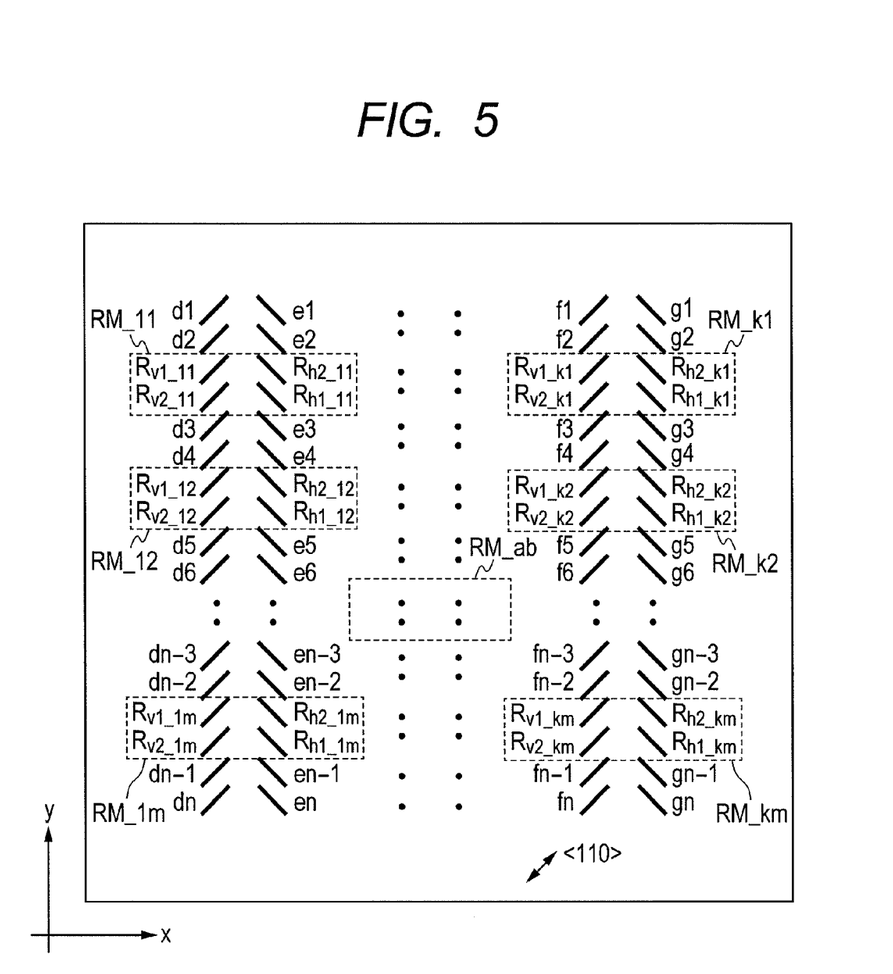
FIG. 5 is a schematic diagram showing a second disposition example of element resistors (diffusion resistors)

Referring to FIGS. 4 and 5, there is described a disposition example of element resistors (diffusion resistors) for use in a bridge of an apparatus for measuring a mechanical quantity, according to a first embodiment of the invention. In the figures, the diffusion resistor is schematically shown by a solid line. With the present embodiment, the element resistors include two kinds of p-type diffusion resistors, and a first kind thereof are the diffusion resistors $R_{vj\_ab}$ with the longitudinal direction (a current direction) thereof being parallel with <110> of a semiconductor substrate while a second kind thereof are the diffusion resistors $R_{hj\_ab}$ with the longitudinal direction (a current direction) thereof being orthogonal to <110> of the semiconductor substrate (herein, j=1, 2)

With the disposition example shown in FIG. 4, the diffusion resistors to serve as the element resistors are disposed in the form of a matrix of 2m-rows×2k-columns. The diffusion resistors $R_{vj\_ab}$ are disposed in each odd column, and the diffusion resistors $R_{hj\_ab}$ are disposed in each even column. Further, the diffusion resistors $R_{vj\_ab}$ disposed in an odd column are formed so as to be parallel with each other, and evenly spaced, and the diffusion resistors $R_{hj\_ab}$ disposed in an even column are similarly formed so as to be parallel with each other, and evenly spaced. By so doing, it is possible to inhibit variation in shape, caused by application of a lithography process, an implantation process, and so forth.

The closer to each other the diffusion resistors are positioned, the smaller will be variation in resistance change of the diffusion resistors, attributable to an effect of the variation in the ambient temperature, an effect of stress due to the heat distribution on the semiconductor substrate, and an effect of the dopant dosage gradient, as previously described. Accordingly, the diffusion resistors $R_{v1\_ab}$, $R_{v2\_ab}$, $R_{h1\_ab}$, and $R_{h2\_ab}$, to serve the element resistors for forming the bridge resistors $R_{v1}$, $R_{v2}$, $R_{h1}$, $R_{h2}$, respectively, are selected from diffusion resistor groups $RM_{ab}$, adjacent to each other. Further, as shown in FIG. 4, the diffusion resistors disposed in the form of a matrix of 2m-rows×2k-columns are kept partitioned into (k×m) pieces of diffusion resistor groups RM. Since a resistance value of each of the diffusion resistors is small, the bridge resistor $R_{v1}$ is formed by connecting (k×m) pieces of the diffusion resistors $R_{v1\_ab}$ in series with each other in order to obtain the resistance value required of the bridge resistor, the bridge resistor $R_{v2}$ is formed by connecting (k×m) pieces of the diffusion resistors $R_{v2\_ab}$ in series with each other, the bridge resistor $R_{h1}$ is formed by connecting (k×m) pieces of the diffusion resistors $R_{h1\_ab}$ in series with each other, and the bridge resistor $R_{h2}$ is formed by connecting (k×m) pieces of the diffusion resistors $R_{h2\_ab}$ in series with each other.

If the bridge resistors $R_{v1}$, $R_{v2}$, $R_{h1}$, $R_{h2}$ are each made up by disposing the diffusion resistors as above, this will enable the respective diffusion resistors $R_{v1\_ab}$, $R_{v2\_ab}$, $R_{h1\_ab}$, and $R_{h2\_ab}$ of the same diffusion resistor group $RM\_{ab}$, to reduce variation in resistance change against the cause of occurrence of the output offset voltage, so that variation will be rendered smaller with reference to the bridge resistors $R_{v1}$, $R_{v2}$, $R_{h1}$, $R_{h2}$, respectively, thereby enabling the output offset voltage of the bridge to be reduced.

FIG. 5 shows a second disposition example. With this disposition example, the diffusion resistors to serve as the element resistors are disposed in a matrix-like manner. In FIGS. 4 and 5, there is shown the disposition example in common in that the diffusion resistors in each odd column with diffusion resistors $R_{vj\_ab}$ disposed therein are formed so as to be parallel with each other, and evenly spaced, and the diffusion resistors in each even column with diffusion resistors $R_{hj\_ab}$ disposed therein are similarly formed so as to be parallel with each other, and evenly spaced. Meanwhile, in the case of this disposition example, diffusion resistor groups RM each including the diffusion resistors to serve the element resistors for forming the bridge resistors $R_{v1}$, $R_{v2}$, $R_{h1}$, $R_{h2}$, respectively, are selectively dispersed from the diffusion resistors disposed in the matrix-like manner to be thereby disposed.

In the case of varying the resistance value of a bridge by use of the apparatus for measuring a mechanical quantity, a change in the resistance value can be realized by varying the number of the diffusion resistors to be connected, and respective positions of the diffusion resistors through a change in an interconnect layer if the diffusion resistors are disposed as shown in FIG. 5, thereby realizing reduction in the cost of the apparatus for measuring a mechanical quantity.

Furthermore, since the bridge resistor can be made up by connection of the diffusion resistors that are disposed in a wider region of a semiconductor substrate, even if localized variation occurs, the number of the diffusion resistors affected by the variation is fewer in comparison with the case of the layout shown in FIG. 4, so that an effect on the resistance value of the bridge resistor can be reduced. For the same reason, it is desirable that the diffusion resistor groups RM are disposed at a uniform density throughout a region where the diffusion resistors are disposed.

Further, with the disposition example of FIG. 5, adjacent diffusion resistor groups RM, each including four diffusion resistors, constitutes one unit of the element resistors for making up a bridge resistor, as is the case with the disposition example of FIG. 4, however, it does not follow that the diffusion resistor groups RM must be adjacent to each other although the diffusion resistor groups RM need be in close proximity to each other in order to average out effects causing the occurrence of the output offset voltage. Further, the diffusion resistors disposed in the same column are formed so as to be parallel with each other, and evenly spaced disposed regardless of whether those are the diffusion resistors to serve as the element resistors, or the diffusion resistors to serve other purposes. This is because of the need for inhibiting variation in shape, occurring in a process for forming diffusion resistors. A diffusion resistor {in the figure, denoted by reference character dn, en, fn, or gn (n: an optional integer), respectively} that is not used as the element resistor may be used as a dummy not connected to other circuit elements, or as an element resistor of other circuits, as will be described later in the description.

With the disposition examples shown in FIGS. 4 and 5, respectively, the diffusion resistors to serve as the element resistors, disposed a matrix of 2-rows×2-columns, are selected for the diffusion resistor group RM, however, the diffusion resistors disposed in a matrix of 1-row×4-columns can be alternatively selected.

Now, feature points of the disposition examples shown in FIGS. 4 and 5, respectively, are summed up as follows. For the sake of clarity, specific diffusion resistors are used by way of example.

(1) The diffusion resistor $R_{v2\_11}$, as a constituent of the bridge resistor $R_{v2}$, is disposed between the diffusion resistors $R_{v1\_11}$, as a constituent of the bridge resistor $R_{v1}$, and $R_{v1\_12}$. The same applies to other bridge resistors. More specifically, the diffusion resistor $R_{v1\_12}$, as a constituent of the bridge resistor $R_{v1}$ is disposed between the diffusion resistor $R_{v2\_11}$, as a constituent of the bridge resistor $R_{v2}$, and $R_{v2\_12}$. The diffusion resistor $R_{h2\_12}$, as a constituent of the resistors $R_{h2}$, is disposed between the diffusion resistor $R_{h1\_11}$, as a constituent of the bridge resistor $R_{h1}$, and the diffusion resistor $R_{h1\_12}$. The diffusion resistor $R_{h1\_11}$, as the constituent of the bridge resistor $R_{h1}$ is disposed between the diffusion resistor $R_{h2\_11}$, as a constituent of the bridge resistor $R_{h2}$, and the bridge resistor $R_{h2\_12}$.

In Japanese Unexamined Patent Application Publication No. 2008-82907, there has been disclosed an embodiment wherein a plural lengths of the impurity layers adjacent to each other are connected together, resulting in an increase in resistance value. As compared with such connection as described in this embodiment, the element resistors making up different bridge resistors, respectively, can be disposed closer to each other.

(2) Multiple impurity layer groups $RM\_{ab}$ are disposed, each of the groups including the diffusion resistors $R_{v1\_ab}$, $R_{v2\_ab}$, $R_{h1\_ab}$, and $R_{h2\_ab}$, the bridge resistor $R_{v1}$ is made up by connecting the diffusion resistors $R_{v1\_ab}$ of the impurity layer group $RM\_{ab}$, with each other, the bridge resistor $R_{v2}$ is made up by connecting the diffusion resistors $R_{v2\_ab}$ of the impurity layer group $RM\_{ab}$, with each other, the bridge resistor $R_{h1}$ is made up by connecting the diffusion resistors $R_{h1\_ab}$ of the impurity layer group $RM\_{ab}$, with each other, and the bridge resistor $R_{h2}$ is made up by connecting the diffusion resistors $R_{h2\_ab}$ of the impurity layer group $RM\_{ab}$, with each other.

In the impurity layer group RM, the diffusion resistors $R_{v1\_ab}$, $R_{v2\_ab}$, and $R_{h1\_ab}$, $R_{h2\_ab}$ are disposed in close proximity to each other, and are most preferably disposed adjacent to each other although the invention is not limited thereto.

The element resistors for forming four pieces of the bridge resistors are dispersedly disposed as one set in a region where the diffusion resistors are formed, so that the bridges insusceptible to an effect of localized variation can be made up.

(3) The diffusion resistors are disposed in the matrix-like manner such that the current direction of the diffusion resistors disposed in the odd column is orthogonal to that of the diffusion resistors disposed in the even column, and the bridge resistors $R_{v1}$, $R_{v2}$ each selectively connect the diffusion resistors disposed in the odd column, in series with each other while $R_{h1}$, $R_{h2}$ each selectively connect the diffusion resistors disposed in the even column, in series with each other.

The diffusion resistors are connected with each other by use of the interconnect layer, and if diffusion resistors are disposed in the matrix-like manner in order to keep the connection resistance at the respective bridge resistors constant, this will render it easier to keep the connection resistance constant.

Figure 6:
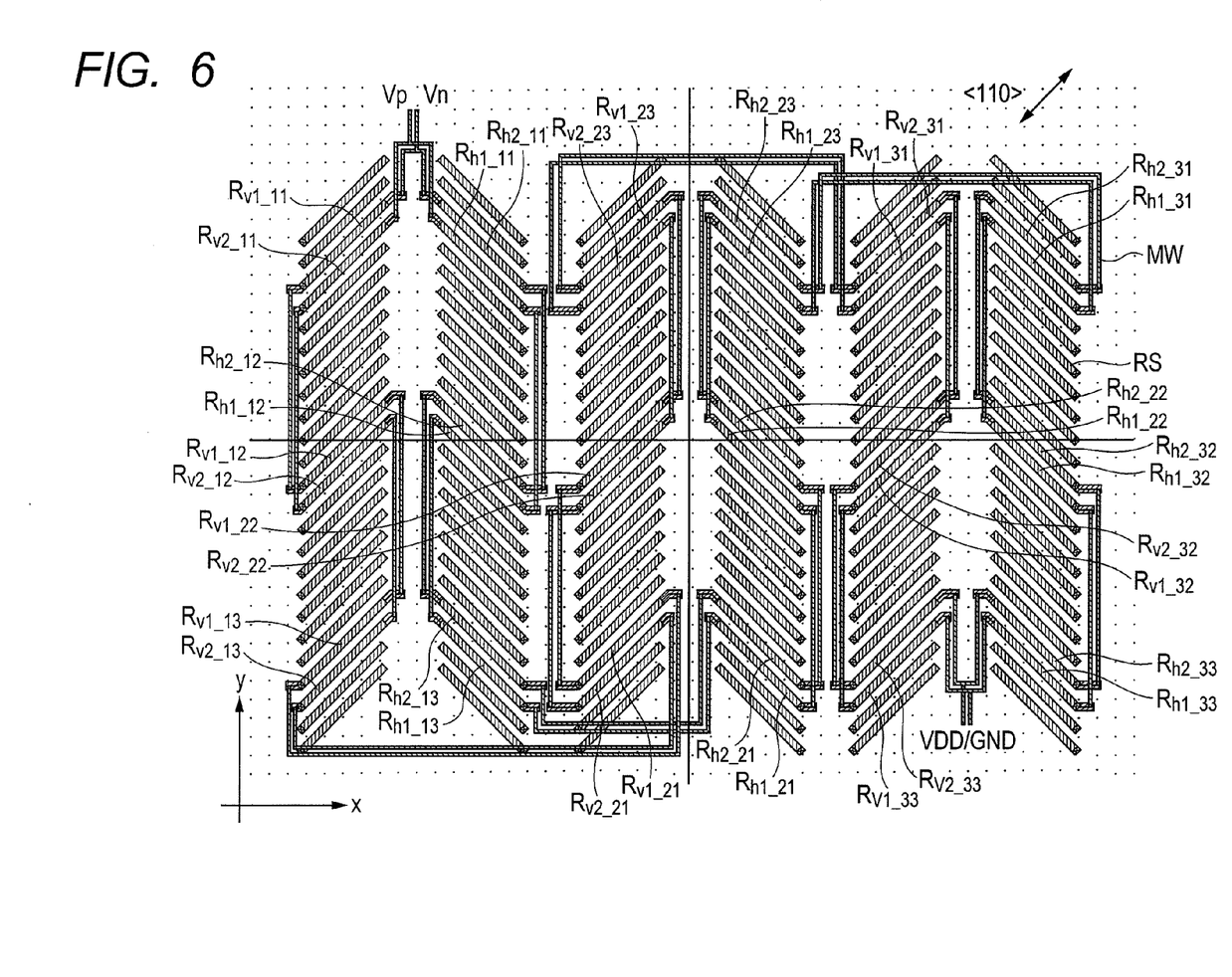
FIG. 6 is a schematic diagram showing a layout of bridges formed by use of diffusion resistors disposed according to the second disposition example.

FIG. 6 shows a layout of bridges formed by use of diffusion resistors RS disposed according to the disposition example shown in FIG. 5. With an example shown in FIG. 6, an example is shown wherein k=3, and m=3, for the sake of clarity. As shown in the figure, p-type diffusion resistors are connected with each other by use of a metal interconnect MW extended primarily in an x-direction, or a y-direction, thereby forming respective bridge resistors. With this example, use is made of a two-layer metal interconnect MW. The diffusion resistors RS are disposed such that the metal interconnect MW is provided to render respective resistance values of the bridge resistors $R_{v1}$, $R_{v2}$, $R_{h1}$, $R_{h2}$, shown in FIG. 3, including resistance of the interconnect, equal to each other while respective interconnect lengths are equal to each other.

Figure 7A:
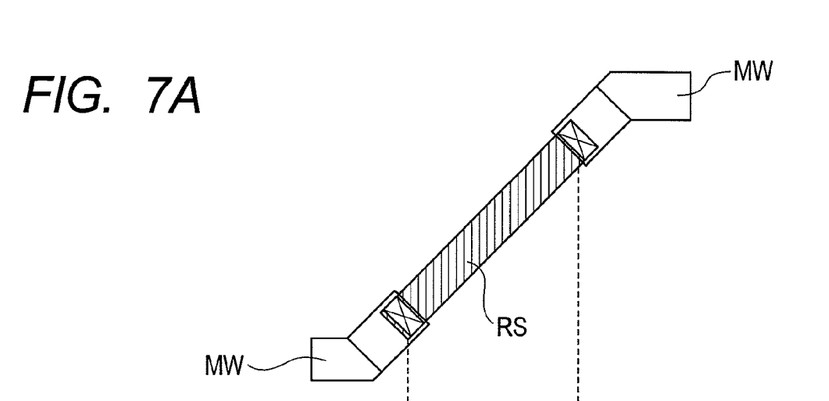
FIG. 7A is a plan view thereof.
Figure 7B:
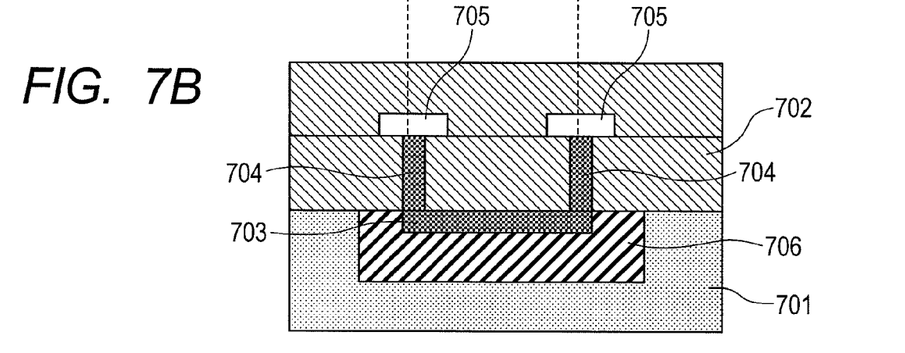
FIG. 7B is a sectional view thereof.

FIGS. 7A and 7B are views of the p-type diffusion resistor (including a connector), in which FIG. 7A is a plan view thereof, and FIG. 7B is a sectional view thereof. With the p-type diffusion resistor, an impurity layer 703 with about $10^{15}$ boron atoms doped therein is formed on the surface of a silicon substrate 701 by ion implantation using a BF gas, and contact through holes 704, and metal interconnects 705 are formed in the impurity layer 703. The surface of the p-type impurity layer 703 functions as a resistor element. The contact through holes, and the metal interconnects are embedded in an interlayer dielectric 702. The impurity layers 703 are electrically isolated from each other by an element isolation region 706.

Second Embodiment

With an apparatus for measuring a mechanical quantity, bridges only may be integrated on a semiconductor chip, and respective potentials at outputs Vp, Vn may be externally outputted, however, the apparatus for measuring a mechanical quantity can be configured such that bridges, amplifiers, and other peripheral circuits are incorporated therein and a potential difference between the outputs Vp, Vn is amplified before it is externally outputted.

Figure 8:
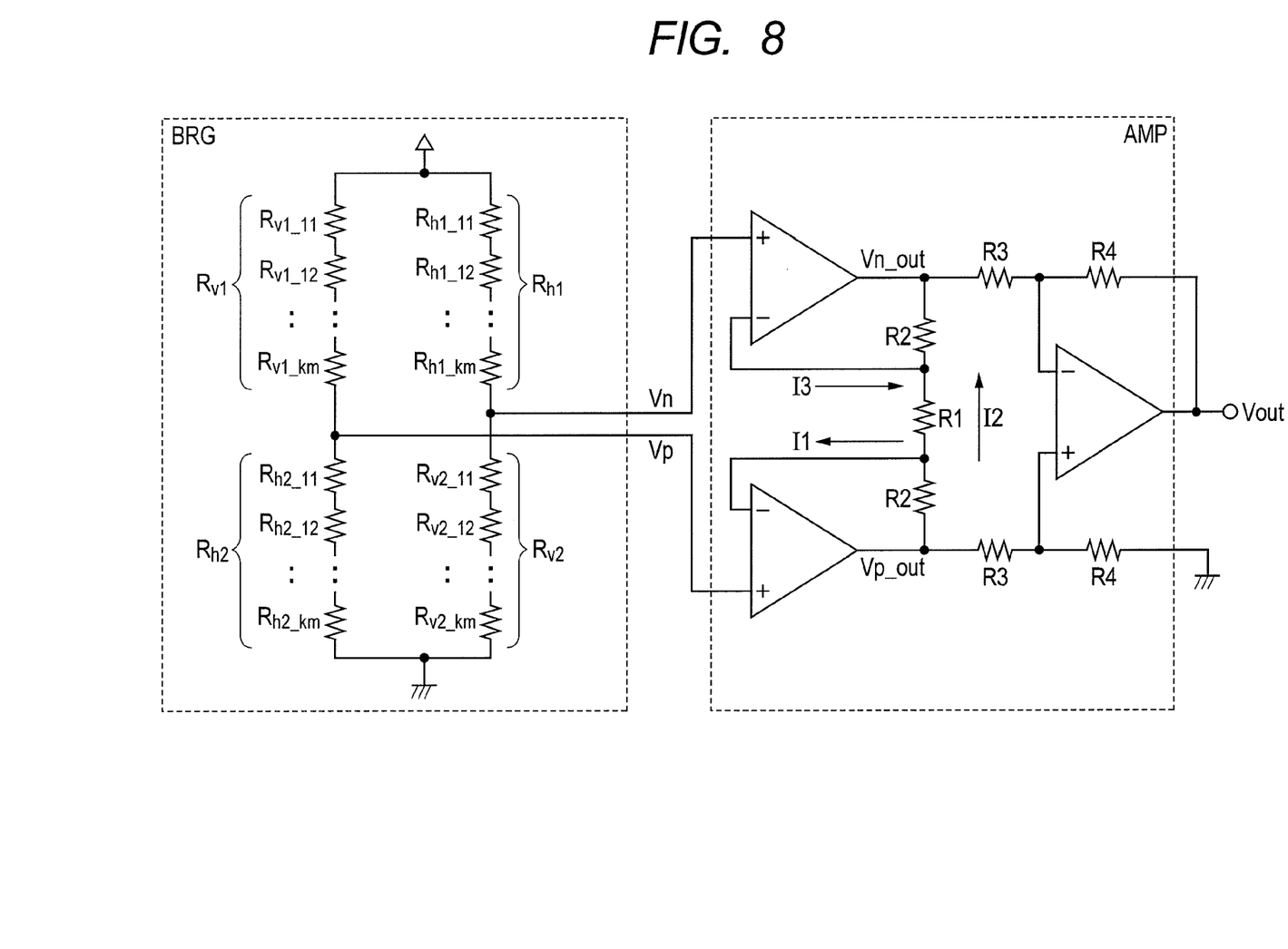
FIG. 8 shows an example of circuit configuration of a bridge, and an amplifier.

FIG. 8 shows an example of a circuit of a bridge BRG, and a circuit of an instrumentation amplifier AMP (hereinafter referred to as an amp), integrated on the same semiconductor substrate. The operation of the amp AMP is described hereinafter with reference to FIG. 8. Since currents flowing through a feedback circuit inside the amp AMP become equal to each other, a relationship of I1=I2=I3 will hold.

On the other hand, an amplifier in the front-end stage of the amp AMP adopts source-follower connection, so that I1= (Vp_out−Vp)/R2, and I3=(Vn−Vn_out)/R2. Further, a relationship of I2=(VP−Vp)/R1 exists. Accordingly, (Vp_out− Vp)/R2=(Vp−Vn)/R1=(Vn−Vn_out)/R2.

Further, an amplifier in the back-end stage of the amp AMP can be expressed as Vout=(R4/R3)×(Vp_out−Vn_out)

To sum up the above, a potential difference (Vp−Vn) outputted by the bridge BRG can be amplified according to a resistor ratio of the amp AMP to Vout=(1+2×R2/R1)×(R4/ R3)×(Vp−Vn) before being outputted.

Figure 9:
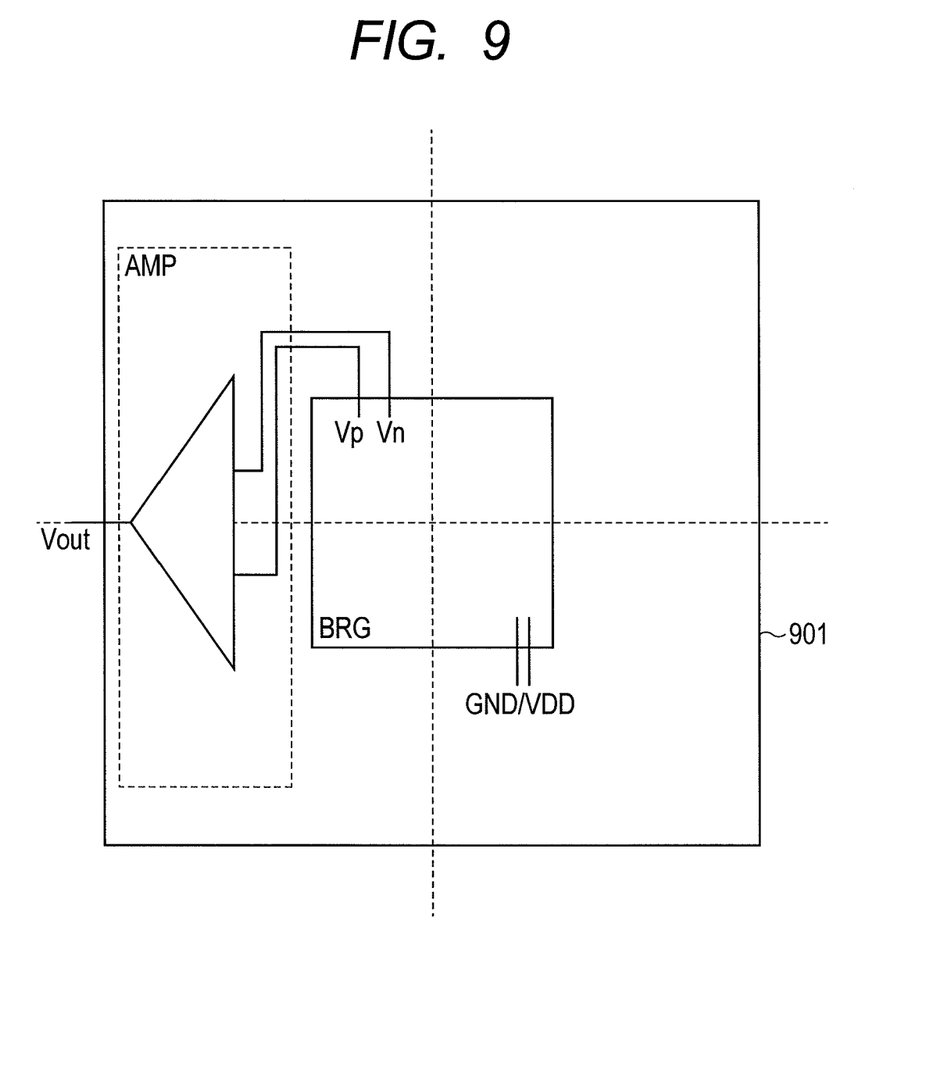
FIG. 9 shows a layout for integrating the bridge, and the amplifier on one chip.

FIG. 9 shows a layout of the circuits shown FIG. 8, integrated on a semiconductor chip. The bridge BRG is disposed in the central region of the semiconductor chip 901. The layout of the bridge BRG is the same as is shown in the first embodiment and a third embodiment which will be described later on. If bridges are integrated in the central region of the chip, this will enable the diffusion resistors making up the bridge to be disposed away as much as possible from respective sides and corners of the semiconductor chip 90, so that it is possible to reduce the effect of stress, and so forth, occurring at the time when the semiconductor chip 901 is stuck to an object under test. Further, peripheral circuits including the amp AMP are disposed in a region surrounding the bridge BRG.

In this case, as resistors for use in the amp AMP, and resistors of a current source such as current mirror circuit, and so forth, for use in other peripheral circuits, use can be made of the diffusion resistors serving as the dummies, disposed in the bridge BRG. By so doing, with reference to the resistors for use in the amp, and the peripheral circuits, respectively, variation in resistance value, due to processing, and variation in resistance value, accompanying a change in temperature, can be rendered equal to those of the diffusion resistors for use in the bridges.

Third Embodiment

There is described hereinafter a variation (a third embodiment) to the embodiments described hereinabove.

Figure 10:
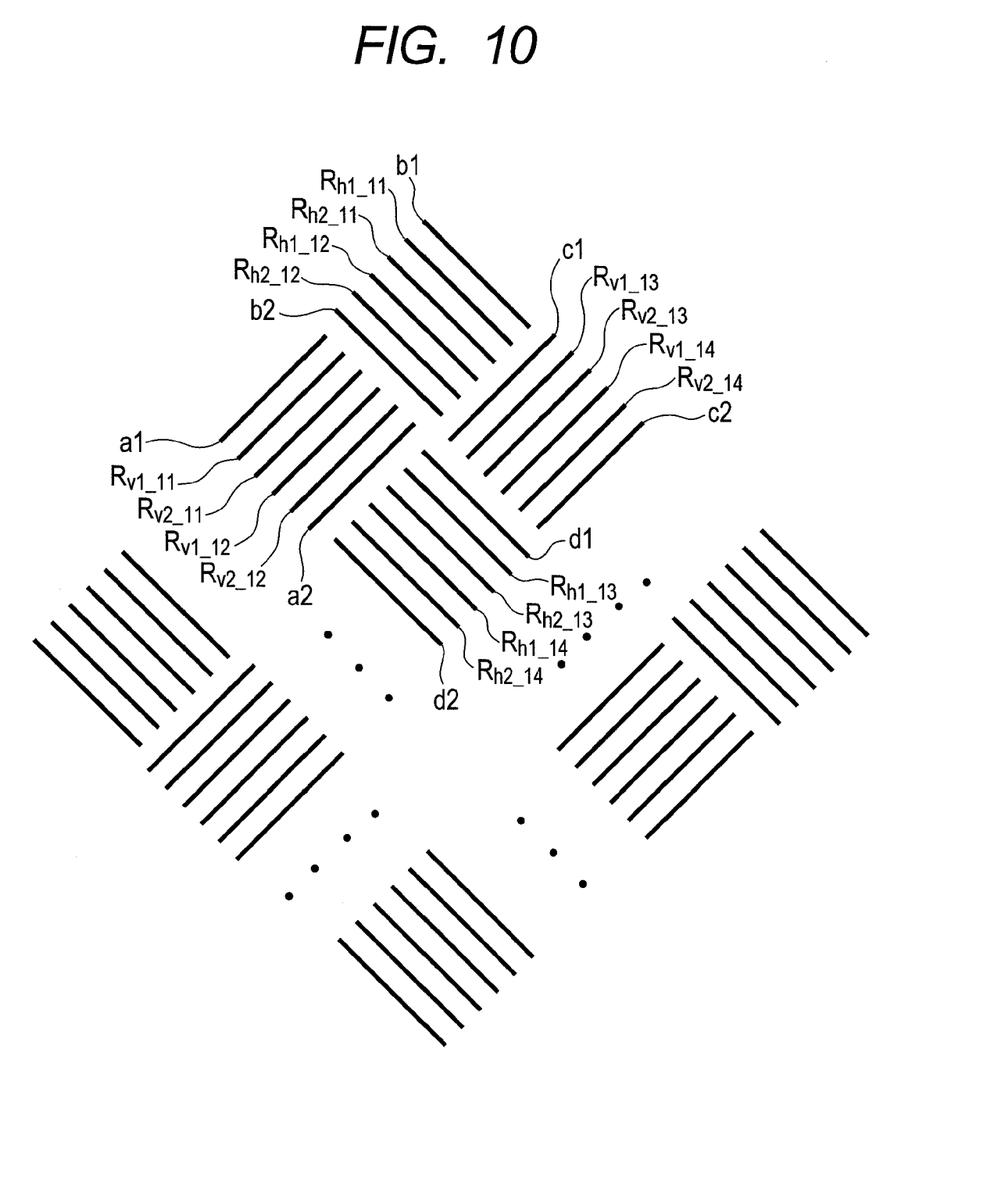
FIG. 10 is a schematic diagram showing a third disposition example of element resistors (diffusion resistors).

FIG. 10 is a schematic diagram showing a third disposition example of element resistors (diffusion resistors). In FIG. 10, there is shown an example wherein the bridge resistor $R_{v1}$ and the bridge resistor $R_{v2}$ are disposed opposite to each other over a circuit, as is the case with the first embodiment, and the element resistors $R_{v1\_ab}$, of the bridge resistor $R_{v1}$ and the element resistors $R_{v2\_ab}$, of the bridge resistor $R_{v2}$, are disposed so as to be adjacent to each other. As to the bridge resistor $R_{h1}$ and the bridge resistor $R_{h2}$, the element resistors $R_{h1\_ab}$ and $R_{v2\_ab}$, are similarly disposed so as to be adjacent to each other, and the element resistors $R_{v1\_ab}$, $R_{v2\_ab}$, as well as the element resistors $R_{h1\_ab}$, $R_{h2}$ are disposed so as to be adjacent to each other, representing an example wherein all the element resistors disposed in 4×k×m fashions are arranged in a staggered manner so as to be closer to each other. With the adoption of a disposition method according to the third embodiment, the diffusion resistors can be disposed at a higher density, so that it is possible to aim at reduction in chip area.

In this case, respective reference numerals a1, a2, b1, b2, c1, c2, d1, d2, shown in FIG. 10, denote a diffusion resistor that is not electrically connected with the bridge, and this diffusion resistor may be connected to a circuit other than the bridge, or may be disposed simply as a dummy, as described with reference to the second embodiment.

Further, there has been described an example wherein the p-type impurity layer is used as the diffusion resistor, however, an n-type impurity layer can be used instead. In such a case, use may be made of element resistors including two kinds of n-type diffusion resistors, a first kind of the diffusion resistors with the longitudinal direction (the current direction thereof) being parallel with <100> of the semiconductor substrate while a second kind of the diffusion resistors with the longitudinal direction (the current direction thereof) being orthogonal to <100> of the semiconductor substrate.

What is claimed is:

1. An apparatus for measuring a mechanical quantity by use of a bridge circuit, comprising:
   a semiconductor substrate;
   a plurality of first impurity layers of a first conductivity type, formed on the semiconductor substrate, and extended in a first direction;
   a plurality of second impurity layers of the first conductivity type, formed on the semiconductor substrate, and extended in a second direction orthogonal to the first direction, wherein the bridge circuit includes:
a first resistor between a first reference potential node and a first output node;
a second resistor between a second reference potential node, and the first output node;
a third resistor between the first reference potential node and a second output node;
a fourth resistor between the second reference potential node and the second output node,
wherein the first resistor, and the fourth resistor are each made up by connecting the plurality of the first impurity layers in series with each other, through the intermediary of an interconnect layer, the second resistor, and the third resistor are each made up by connecting the plurality of the second impurity layers in series with each other, through the intermediary of an interconnect layer,
wherein the first impurity layer making up the fourth resistor is disposed between two layers of the first impurity layers for making up the first resistor, connected with each other through the intermediary of the interconnect layer,
wherein the first impurity layer for making up the first resistor is disposed between two layers of the first impurity layers for making up the fourth resistor, connected with each other through the intermediary of the interconnect layer,
wherein the second impurity layer for making up the third resistor is disposed between two layers of the second impurity layers for making up the second resistor, connected with each other through the intermediary of the interconnect layer, and
wherein the second impurity layer for making up the second resistor is disposed between two layers of the second impurity layers for making up the third resistor, connected with each other through the intermediary of the interconnect layer.

2. The apparatus for measuring a mechanical quantity, according to claim 1, wherein the first and second impurity layers are each a p-type impurity layer, and the first direction is <110> of the semiconductor substrate.

3. The apparatus for measuring a mechanical quantity, according to claim 1, wherein the apparatus is stuck to, or embedded in an object under test to thereby measure strain of the object under test.

4. The apparatus for measuring a mechanical quantity, according to claim 1, wherein the plurality of the first impurity layers of the first conductivity type are formed so as to be parallel with each other, and evenly spaced, and the plurality of the second impurity layers of the first conductivity type are formed so as to be parallel with each other, and evenly spaced disposed.

5. The apparatus for measuring a mechanical quantity, according to claim 1, wherein the plurality of the first impurity layers of the first conductivity type include a first impurity layer for forming neither the first resistor, nor the fourth resistor, said first impurity layer serving as a dummy resistor electrically unconnected to other circuits while the plurality of the second impurity layers of the first conductivity type include a second impurity layer for forming neither the second resistor, nor the third resistor, said second impurity layer serving as a dummy resistor electrically unconnected to other circuits.

6. The apparatus for measuring a mechanical quantity, according to claim 1, further comprising a peripheral circuit including an amplifier for amplifying a potential difference between the first output node, and the second output node, wherein the plurality of the first impurity layers of the first conductivity type include a first impurity layer for forming neither the first resistor, nor the fourth resistor while the plurality of the second impurity layers of the first conductivity type include a second impurity layer for forming neither the second resistor, nor the third resistor, said first impurity layer, or said second impurity layer being used as a resistor of the peripheral circuit.

7. The apparatus for measuring a mechanical quantity, according to claim 1, further comprising a peripheral circuit including an amplifier for amplifying a potential difference between the first output node, and the second output node, wherein the first impurity layers and the second impurity layers are formed in a central part of a semiconductor chip, and the peripheral circuit is formed around the central part.

8. An apparatus for measuring a mechanical quantity by use of a bridge circuit, comprising:
a semiconductor substrate; and
a plurality of impurity layer groups formed on the semiconductor substrate;
wherein the plurality of the impurity layer groups each include a plurality of first impurity layers of a first conductivity type, extended in a first direction, and a plurality of second impurity layers of a first conductivity type, extended in a second direction orthogonal to the first direction,
wherein the bridge circuit includes:
a first resistor between a first reference potential node and a first output node;
a second resistor between a second reference potential node, and the first output node;
a third resistor between the first potential reference node and a second output node;
a fourth resistor between the second potential reference node and the second output node,
wherein the first resistor is made up by connecting the first impurity layers of any one of the plurality of the impurity layer groups, in series with each other, through the intermediary of an interconnect layer,
wherein the second resistor is made up by connecting the second impurity layers of any one of the plurality of the impurity layer groups, in series with each other, through the intermediary of an interconnect layer,
wherein the third resistor is made up by connecting the second impurity layers of any one of the plurality of the impurity layer groups, in series with each other, through the intermediary of an interconnect layer, and
wherein the fourth resistor is made up by connecting the first impurity layers of any one of the plurality of the impurity layer groups, in series with each other, through the intermediary of an interconnect layer.

9. The apparatus for measuring a mechanical quantity, according to claim 8, wherein, in each of the plurality of the impurity layer groups,
the first impurity layers making up the first resistor are not connected in series with the first impurity layers of other impurity layer groups, through the intermediary of an interconnect layer,
the second impurity layers making up the second resistor are not connected in series with the second impurity layers of other impurity layer groups, through the intermediary of an interconnect layer,
the second impurity layers making up the third resistor are not connected in series with the second impurity layers of other impurity layer groups, through the intermediary of an interconnect layer, and the first impurity layers making up the fourth resistor are not connected in series with the first impurity layers of other impurity layer groups, through the intermediary of an interconnect layer.

10. The apparatus for measuring a mechanical quantity, according to claim 8, wherein the first and second impurity layers are each a p-type impurity layer, and the first direction is <110> of the semiconductor substrate.

11. The apparatus for measuring a mechanical quantity, according to claim 8, wherein the apparatus is stuck to, or embedded in an object under test to thereby measure strain of the object under test.

12. The apparatus for measuring a mechanical quantity, according to claim 8, wherein the plurality of the impurity layer groups include a first impurity layer group, and a second impurity layer group, a plurality of third impurity layers of a first conductivity type are formed between the first impurity layer of the first impurity layer group, and the first impurity layer of the second impurity layer group, the first impurity layers, and the third impurity layers each being formed so as to be parallel with each other, and evenly spaced, and a plurality of fourth impurity layers of a first conductivity type are formed between the second impurity layer of the first impurity layer group, and the second impurity layer of the second impurity layer group, the second impurity layers, and the fourth impurity layers each being formed so as to be parallel with each other, and evenly spaced.

13. The apparatus for measuring a mechanical quantity, according to claim 12, wherein the third impurity layer or the fourth impurity layer serves as a dummy resistor electrically unconnected to other circuits.

14. The apparatus for measuring a mechanical quantity, according to claim 12, further comprising a peripheral circuit including an amplifier for amplifying a potential difference between the first output node, and the second output node of the bridge circuit, wherein the third impurity layer or the fourth impurity layer is used as resistors of the peripheral circuit.

15. The apparatus for measuring a mechanical quantity, according to claim 8, further comprising a peripheral circuit including an amplifier for amplifying a potential difference between the first output node, and the second output node of the bridge circuit, wherein the first impurity layers and the second impurity layers are formed in a central part of a semiconductor chip, and the peripheral circuit is formed around the central part.

16. An apparatus for measuring a mechanical quantity by use of a bridge circuit, comprising:
a semiconductor substrate; and
a plurality of impurity layers of a first conductivity type, formed on the semiconductor substrate, and disposed in a matrix-like fashion, the plurality of the impurity layers of the first conductivity type, each including a plurality of first impurity layers disposed in each odd column, and extended in a first direction, and a plurality of second impurity layers, disposed in each even column, and extended in a second direction orthogonal to the first direction,
wherein the bridge circuit includes:
a first resistor between a first reference potential node and a first output node;
a second resistor between a second reference potential node, and the first output node;
a third resistor between the first reference potential node and a second output node;
a fourth resistor between the second reference potential node and the second output node,
wherein the first resistor, and the fourth resistor are each made up by selectively connecting the plurality of the first impurity layers disposed in the each odd column, in series with each other, and the second resistor, and the third resistor are each made up by connecting the plurality of the second impurity layers disposed in the each even column, in series with each other.

17. The apparatus for measuring a mechanical quantity, according to claim 16, wherein adjacent first impurity layers among the plurality of the first impurity layers disposed in the each odd column are selected as the first impurity layers for forming the first resistor, and the first impurity layers for forming the fourth resistor, respectively, and adjacent second impurity layers among the plurality of the second impurity layers disposed in the each even column are selected as the second impurity layers for forming the second resistor, and the second impurity layers for forming the third resistor, respectively.

18. The apparatus for measuring a mechanical quantity, according to claim 17, wherein the adjacent first impurity layers are disposed so as to be adjacent to the adjacent second impurity layers.

19. The apparatus for measuring a mechanical quantity, according to claim 16, wherein the impurity layer is a p-type impurity layer, and the first direction is <110> of the semiconductor substrate.

20. The apparatus for measuring a mechanical quantity, according to claim 16, further comprising:
a peripheral circuit including an amplifier for amplifying a potential difference between the first output node, and the second output node,
wherein the first impurity layers and the second impurity layers are formed in a central part of a semiconductor chip, and
wherein the peripheral circuit is formed around the central part.

* * * * *